United States Patent
Sung

(10) Patent No.: US 9,204,367 B2
(45) Date of Patent: Dec. 1, 2015

(54) METHOD OF WIRELESSLY CONNECTING AT LEAST TWO DEVICES AND WIRELESSLY CONNECTABLE DEVICE USING THE METHOD

(75) Inventor: Pan-jun Sung, Busan (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/598,806

(22) Filed: Aug. 30, 2012

(65) Prior Publication Data

US 2013/0053014 A1  Feb. 28, 2013

(30) Foreign Application Priority Data

Aug. 31, 2011  (KR) .................... 10-2011-0088234

(51) Int. Cl.
*H04L 12/403* (2006.01)
*H04W 48/08* (2009.01)
*H04W 84/18* (2009.01)

(52) U.S. Cl.
CPC .............. *H04W 48/08* (2013.01); *H04W 84/18* (2013.01)

(58) Field of Classification Search
CPC .... H04W 76/02; H04W 76/021; H04W 12/00
USPC ........ 455/412.1, 414.1, 415, 419, 420, 432.3, 455/417
See application file for complete search history.

(56) References Cited

U.S. PATENT DOCUMENTS

| | | | |
|---|---|---|---|
| 6,415,146 B1 * | 7/2002 | Capece .......................... | 455/517 |
| 6,957,067 B1 * | 10/2005 | Iyer et al. ..................... | 455/435.1 |
| 7,336,926 B2 * | 2/2008 | Noda et al. .................... | 455/41.2 |
| 7,362,722 B2 * | 4/2008 | Otsuka .......................... | 370/328 |
| 8,898,710 B2 * | 11/2014 | Eguchi et al. .................... | 725/80 |
| 2004/0131188 A1 * | 7/2004 | Wang et al. ..................... | 380/270 |
| 2005/0088980 A1 * | 4/2005 | Olkkonen et al. ............ | 370/255 |
| 2007/0066304 A1 * | 3/2007 | Lee ................. | 455/436 |
| 2007/0190938 A1 * | 8/2007 | Hillyard ....................... | 455/41.1 |
| 2008/0160957 A1 * | 7/2008 | Ono .............................. | 455/408 |
| 2009/0047974 A1 * | 2/2009 | Quinn ........................ | 455/456.1 |
| 2010/0020746 A1 * | 1/2010 | Zaks ............................ | 370/328 |
| 2010/0325425 A1 * | 12/2010 | Park et al. ..................... | 713/155 |

(Continued)

FOREIGN PATENT DOCUMENTS

| | | |
|---|---|---|
| KR | 1020100092828 | 8/2010 |
| KR | 1020100136255 | 12/2010 |

OTHER PUBLICATIONS

WI-FI Alliance:"Wi-Fi Peer to Peer (P2P) Specification v1.1", WI-FI Alliance Specication, Jan. 1, 2010, pp. 1-159.

(Continued)

*Primary Examiner* — Jean Gelin
(74) *Attorney, Agent, or Firm* — Staas & Halsey LLP

(57) ABSTRACT

A method of wirelessly connecting at least two devices for data communication and a device that is wirelessly connectable by using the method, the method including: generating and wirelessly sending service set identifier (SSID) information of the at least two devices, the at least two devices performing the generating and the wireless sending, collecting and analyzing the wirelessly sent SSID information, the collecting and the analyzing to be performed by the at least two devices, setting one of the at least two devices as a server based on a result of the analyzing, and wirelessly connecting the at least two devices, the wirelessly connecting to be performed by the device set as the server.

25 Claims, 11 Drawing Sheets

(56) References Cited

U.S. PATENT DOCUMENTS

| | | | |
|---|---|---|---|
| 2010/0331082 A1* | 12/2010 | Kim et al. | 463/30 |
| 2011/0026504 A1* | 2/2011 | Feinberg | 370/338 |
| 2011/0085528 A1* | 4/2011 | Choi et al. | 370/338 |
| 2011/0159818 A1* | 6/2011 | Scherzer et al. | 455/67.11 |
| 2011/0201275 A1* | 8/2011 | Jabara et al. | 455/41.2 |
| 2011/0222518 A1* | 9/2011 | Ota et al. | 370/338 |
| 2013/0128817 A1* | 5/2013 | Adachi et al. | 370/328 |
| 2013/0171940 A1* | 7/2013 | Miki et al. | 455/41.2 |
| 2013/0231088 A1* | 9/2013 | Jabara et al. | 455/411 |

OTHER PUBLICATIONS

European Search Report dated Feb. 12, 2015 in corresponding European Patent Application 12182469.2.

\* cited by examiner

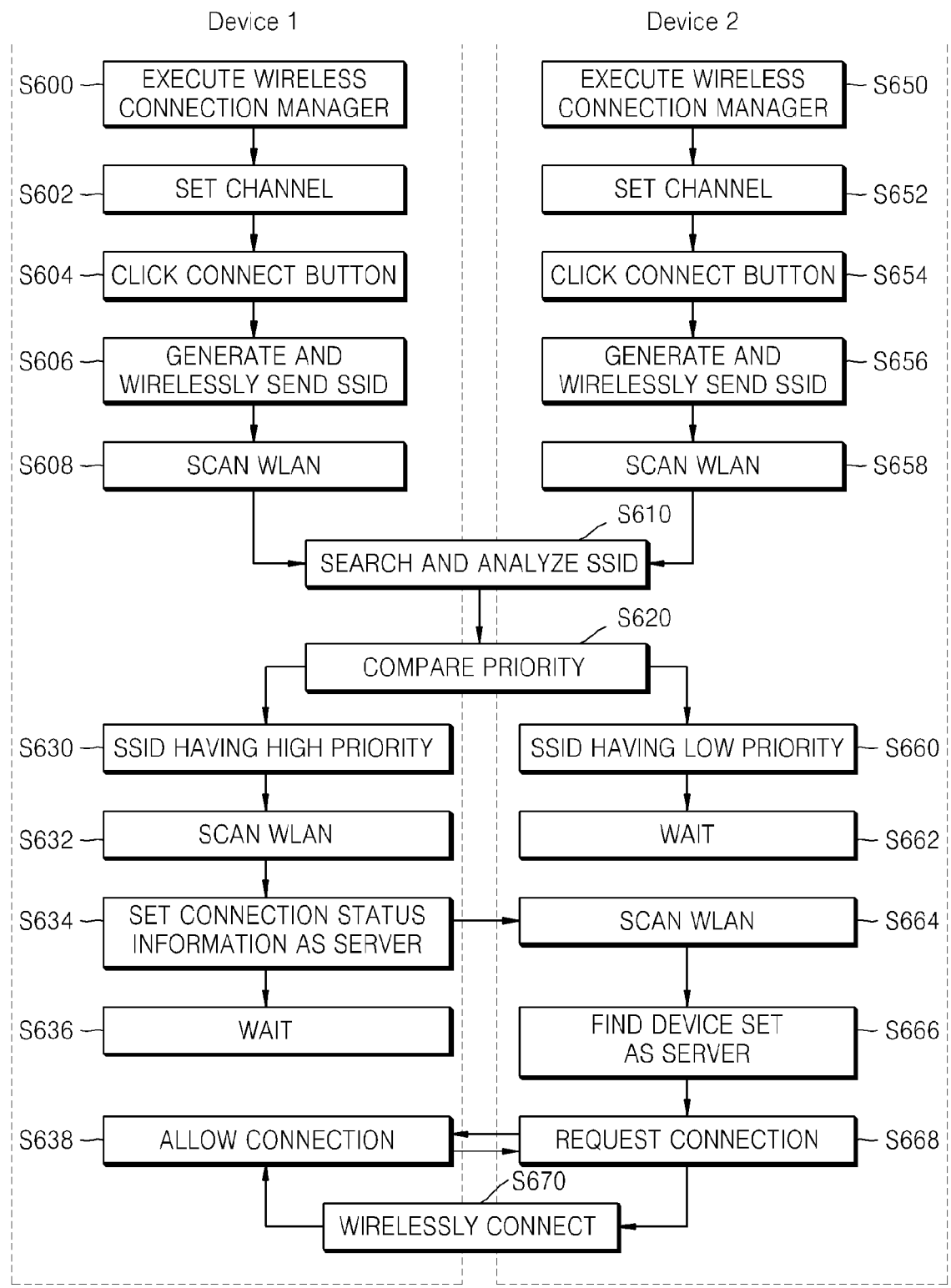

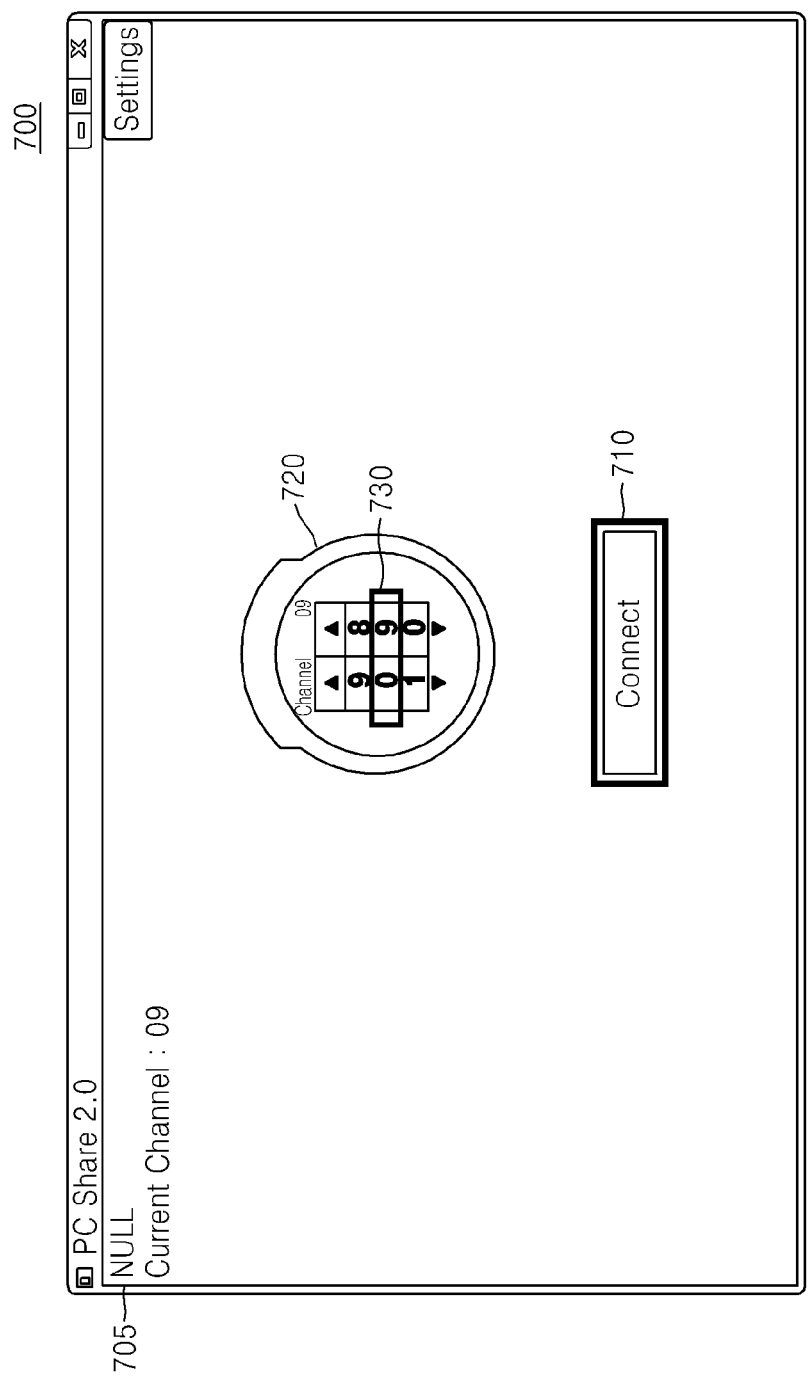

METHOD OF WIRELESSLY CONNECTING AT LEAST TWO DEVICES AND WIRELESSLY CONNECTABLE DEVICE USING THE METHOD

CROSS-REFERENCE TO RELATED APPLICATIONS

This application claims priority under 35 U.S.C. §119 from Korean Patent Application No. 10-2011-0088234, filed on Aug. 31, 2011, in the Korean Intellectual Property Office, the disclosure of which is incorporated herein in its entirety by reference.

BACKGROUND OF THE INVENTION

1. Field of the Invention

The present general inventive concept relates to wireless connection between devices, and more particularly, to a method of wirelessly connecting at least two devices and a wirelessly connectable device using the method.

2. Description of the Related Art

Windows-based operating systems currently support a software-enabled access point (softAP) function by using virtual WiFi from Windows 7. The softAP function is a function of changing a wireless local area network (WLAN) card to a wireless access point (AP). This enables another device to perform a wireless search and a wireless connection and access the Internet.

Users change the WLAN card to the wireless AP by using the softAP function in a Windows 7 environment as follows. First, a WLAN mode is changed to another mode. The WLAN mode is a default setting and means the Internet is accessible over a WLAN. In this regard, a "switch to a station mode" is selected for a wireless AP mode.

Thereafter, a wired/wireless LAN card that is installed in a computer and is connected to the Internet is selected. Then, a wireless LAN mode is changed to a softAP mode. Thereafter, basic settings, such as a name of a wireless AP or limited access, are made. In this regard, a service set identifier (SSID) setting, a password setting, a channel setting, and a blocking setting using media access control (MAC) are set. Such settings enable another device to perform a wireless search and a wireless connection and access the Internet. In this regard, a password is input to access a softAP that was set as described above in another computer. If the password is correctly input, the softAP function becomes available.

Although such a softAP function is very useful, knowledge relating to a virtual WiFi, an SSID, etc., is necessary, and a user's input and settings are also necessary, in order to use the softAP function. Also, a password of the softAP is necessary to access the softAP. Thus, the softAP may not be easy to use.

SUMMARY OF THE INVENTION

The present general inventive concept provides a method of wirelessly connecting at least two devices, capable of wireless connection between devices without having to perform an inconvenient setting process.

The present general inventive concept also provides a device wirelessly connectable to an external device, capable of wireless connection between devices without having to perform an inconvenient setting process.

Additional features and utilities of the present general inventive concept will be set forth in part in the description which follows and, in part, will be obvious from the description, or may be learned by practice of the general inventive concept.

According to features and utilities of the present general inventive concept, there is provided a method of wirelessly connecting at least two devices for data communication, the method including generating and wirelessly sending service set identifier (SSID) information of the at least two devices, the at least two devices performing the generating and the wireless sending, collecting and analyzing the wirelessly sent SSID information, the collecting and the analyzing to be performed by the at least two devices, setting one of the at least two devices as a server based on a result of the analyzing, and wirelessly connecting the at least two devices, the wirelessly connecting to be performed by the device set as the server.

The setting may include setting one of the at least two devices as the server according to a priority between the SSID information of the at least two devices.

The setting may include if no device is set as the server, setting one of the at least two devices as the server according to the priority between the SSID information of the at least two devices.

The setting may include if there is a device set as the server based on the result of the analyzing, requesting wireless connection from the device set as the server.

Each of the SSID information may include connection status information indicating wireless connection status of a corresponding device.

The connection status information may include one of a server status indicating connection status of a device set as a server, a client status indicating connection status of a device connected to the device set as the server, and a device status indicating a connection status of a device that is not wirelessly connected to an external device.

Each of the SSID information may further include wireless connection priority information of the corresponding device, and the wireless connection priority information includes a serial number or a MAC (Media Access Control) address of a wireless local area network (WLAN) card installed in the corresponding device or a random number optionally generated by the corresponding device, wherein a greater serial number or a MAC (Media Access Control) address or random number is set to indicate a higher priority.

Each of the SSID information may further include channel information to identify a group of devices and being settable by a user through a user interface, and the wireless connecting includes comparing the channel information of the at least two devices, if the channel information of the at least two devices is the same with each other, checking whether the connection status information is set as the server, and wirelessly connecting a device that is to be wirelessly connected and the device whose connection status information is set as the server.

Each of the SSID information may further include an identifier of a wireless connection program installed in a corresponding device, and the wireless connecting includes determining whether the identifiers of the wireless connection programs respectively installed in at least two devices are the same, if the identifiers of the wireless connection programs are the same, checking whether the connection status information of the device is set as the server, and, if the connection status information is set as the server, wirelessly connecting the at least two devices, wherein the wireless connecting is performed by the device set as the server.

The wireless connecting may include if the device set as the server is referred to as a server device, and a device other than the server device requests wireless connection from the server device, displaying a wireless connection request on a screen of the server device, and if the server device accepts the wireless connection request and allows access thereto, wirelessly connecting the server device to the device that requests the wireless connection and displaying a representation of the requesting device on the screen of the server device.

The wirelessly sending of the SSID information may include when the at least two devices support a soft-AP function that changes a WLAN card into a wireless AP, executing the soft AP function and wirelessly sending the SSID information.

According to other features and utilities of the present general inventive concept, there is also provided a device wirelessly connectable to at least one device, the device including an SSID information generation manager to generate SSID information of the device, an SSID information sending manager to wirelessly send the generated SSID information, an SSID collection/analysis manager to collect and to analyze wirelessly sent SSID information of the at least one device, and a connection/setting manger to set the device as a server or a client based on a result of the analyzing, and to perform or to request wireless connection between the device and the at least one device based on a result of the setting.

The connection/setting manager may set one of the device and the at least one device as the server according to a priority between the SSID information thereof.

If none of the device and the at least one device is set as the server, the connection/setting manager of the device sets one of the device and the at least one device as the server according to a priority between the SSID information thereof.

If the device is set as the server based on the result of the analyzing by the SSID collection/analysis manager, a connection/setting manager of the at least one device requests to the device set as the server wireless connection between the device and the at least one device.

The SSID information of the device and the at least one device comprises connection status information indicating wireless connection statuses of the device and the at least one device, respectively.

The connection status information comprises one of a server status indicating connection status of device set as a server, a client status indicating connection status of a device connected to the device set as the server, and a device status indicating a connection status of a device that is not wirelessly connected to an external device.

The SSID information of the device and the at least one device may further include wireless connection priority information of the device and the at least one device, respectively.

Each of the wireless connection priority information of the device and the at least one device comprises a serial number or a MAC (Media Access Control) address of a WLAN card installed in each of the at least one device or a random number optionally generated by each of the device and the at least one device, wherein a greater serial number or a MAC (Media Access Control) address or random number has a higher priority.

Each of the SSID information may further include channel information to identify a group of devices and being settable by a user through a user interface, the connection/setting manager compares the channel information of the device and the at least one device, and if the channel information is the same, the connection/setting manager of the device checks whether the connection status information of the at least one device is set to indicate the server, and, if the connection status information of the at least one device is set to indicate the server, the connection/setting manager of the device accesses the at least one device set as the server and wirelessly connects the device and the at least one device.

Each of the SSID information may further include an identifier of a wireless connection program installed in each of the device and the at least one device, and the connection/setting manager determines whether the identifiers of the wireless connection programs of the device and the at least one device are the same, if the identifiers of the wireless connection programs are the same, the connection/setting manager checks whether the connection status information is set to indicate the server, and, if the connection status information is set to indicate the server, requests the wireless connection from the device set as the server.

If a device having a wireless connection status that is set as the server is referred to as a server device, and a device other than the server device requests wireless connection from the server device, the connection/setting manager of the server device displays a wireless connection request on a screen of the server device, and if the server device accepts a wireless connection request and allows access thereto, the connection/setting manager of the server device wirelessly connects the device that requests the wireless connection to the server device, and displays a representation of the requesting device on the screen of the server device.

According to other features and utilities of the present general inventive concept, there is provided a device wirelessly connectable to at least one device, the device including a soft AP module to enable a WLAN card installed in the device to be used as a wireless AP, and a wireless connection manager to communicate with the soft AP module, to generate SSID information and to wirelessly send the generated SSID information through the soft AP module, to collect SSID information generated by the at least one device through the soft AP module, to analyze the collected SSID information and to set the device as a server or a client, and to perform or to request wireless connection between the device and the at least one device according to a result of the setting.

The wireless connection manager may include an SSID information generation manager to generate SSID information of the device, an SSID collection/analysis manager to collect and analyze wirelessly sent SSID information of the at least one device, and a connection/setting manger to request wireless connection from the device set as the server if there is the device set as the server, and if no device is set as the server, to set one of the device and the at least one device as the server according to a priority between the SSID information thereof, wherein one of the device and the at least one device set as the server waits until another external device requests wireless connection thereto.

Each of the SSID information of the device and the at least one device may include connection status information indicating wireless connection status of corresponding one of the device and the at least one device, and wireless connection priority information indicating a wireless connection priority between the device and the at least one device.

Each of the SSID information of the device and the at least one device may further include an identifier of a wireless connection program installed in the device or the at least one device, and channel information used to identify a group of devices that are to be wirelessly connected, and the device further includes a channel setting manager to set the channel information according to a user's selection or input.

The SSID collection/analysis manager collects SSID information that is wirelessly sent from an external device that is to be wirelessly connected, determines whether the identifiers of the wireless connection program and the channel information between the device and the external device are the same, and if the identifiers of the wireless connection program and the channel information are the same, the SSID collection/analysis manager checks whether any of the connection status information is set to indicate the server.

If a device having a wireless connection status set to indicate the server is referred to as a server device, and a device other than the server device requests wireless connection from the server device, the connection/setting manager displays a wireless connection request on a screen of the server device, and wherein if the server device accepts a wireless connection request and allows access thereto, the connection/setting manager wirelessly connects the server device to the external device, and displays a representation of the external device on the screen of the server device.

According to other features and utilities of the present general inventive concept, there is provided a computer-readable recording medium having recorded thereon a computer program for executing the above method.

According to other features and utilities of the present general inventive concept, there is also provided a method of controlling a device to wirelessly connect the device with at least one external device, the method including receiving service set identifier (SSID) information of the at least one external device, analyzing SSID information of the device and the SSID information of the at least one external device upon receipt of the SSID information of the at least one external device, determining connection statuses of the device and the at least one external device based on the analysis of the SSID information of the device and the at least one external device, and wirelessly connecting the device with the at least one external device based on the connection status of the device.

The connection status of the device may be one of a server status indicating the connection status of the device set as a server, a client status indicating the connection status of the device connected to an external device set as the server, and a device status indicating the connection status of the device that is not wirelessly connected to an external device.

If the connection status of the device is set as a server, the device may wait to receive a connection request from another device that is set as a client to connect to the device. If the connection status of one of the at least one device is set as a server, the device may be set as a client and sends a connection request to connect to the one of the at least one device is set as the server.

The determining may include, if none of the connection statuses of the device and the at least one external device are set as a server, setting one of the device and the at least one external device as the server according to a priority between the SSID information of the device and the SSID information of the at least one external device. The determining may further include, if the one of device and the at least one external device is as the server, setting other one of the device and the at least one external device as a client. The priority may be determined based on wireless connection priority information of the device and the at least one external device included in the SSID information of the device and the at least one external device. The wireless connection priority information of the device and the wireless connection priority information of the at least one external device may be serial numbers or a MAC (Media Access Control) address of a wireless connection units of the device and the at least one external device. The wireless connection priority information of the device and the wireless connection priority information of the at least one external device may be random numbers generated in the device and the at least one external device.

The wirelessly connecting may include comparing channel information of the device and the at least one device, and if the channel information of the device is the same as the channel information of the at least one device, enabling wireless connection between the device and the at least one device, wherein the channel information of the device and the at least one device is respectively included in the SSID information of the device and the at least one device. The wirelessly connecting may include comparing an identifier of a wireless connection program of the device and an identifier of a wireless connection program of the at least one device, and if the identifier of the device is the same as the identifier of the at least one device, enabling wireless connection between the device and the at least one device, wherein the identifiers of the device and the at least one device are respectively included in the SSID information of the device and the SSID information of the at least one device.

According to other features and utilities of the present general inventive concept, there is also provided a method of wirelessly connecting one device and at least one external device, the method including installing wireless connection programs in the one device and the at least one external device, executing the installed wireless connection programs in the one device and the at least one external device, displaying channel setting screens for setting channels on the one device and the at least one external device, and if a user inputs channel information through the channel setting screens and clicks a connection button provided by the channel setting screens, wirelessly connecting the one device and the at least one external device.

The wirelessly connecting the one device and the at least one external device may include if the user inputs channel information through the channel setting screens and clicks the connection button provided by the channel setting screens, displaying a screen that waists for a connection request from the at least one external device, wherein the one device performs the displaying, if the one device receives the connection request from the at least one external device, displaying a connection allowance interface screen that asks whether access for a wireless connection is allowed, wherein the one device performs the displaying, if access of the at least one external device is allowed, wirelessly connecting the one device to the at least one external device whose access is allowed, wherein the one device performs the wirelessly connecting, informing connection of a new device through a user interface screen, wherein the one device performs the notifying, and displaying a file registered by the one device and a file registered by the wirelessly connected external device on the user interface screen, wherein the one device performs the displaying.

According to other features and utilities of the present general inventive concept, there is also provided a device wirelessly connectable to at least one external device, the device may include a storage unit for storing wireless connection programs in the device and the at least one external device, and a processor for executing the wireless connection programs, wherein, if the processor executes the wireless connection programs, the processor may display channel setting screens for setting channels on the device and the at least one external device, if a user inputs channel information through the channel setting screens and clicks a connection button provided by the channel setting screens, the one device and the at least one external device may be wirelessly connected to each other.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 6 is a flowchart illustrating a wireless connection method in a case where connection status information of a device is not set to indicate a server or a client but is set to indicate a device, according to an exemplary embodiment of the present general inventive concept;

FIG. 7 is an example illustrating a channel setting screen displayed on a device when a channel setting manager sets a channel;

DETAILED DESCRIPTION

Figure 1:
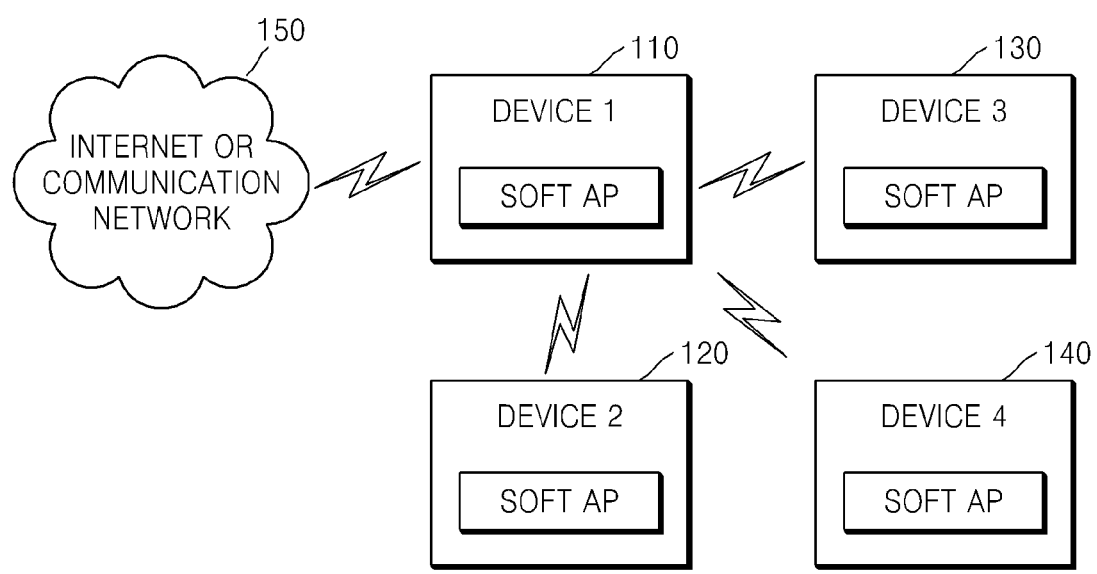
FIG. 1 is a block diagram illustrating a wireless connecting system according to an exemplary embodiment of the present general inventive concept.

Hereinafter, the present general inventive concept will be described in detail by explaining embodiments of the invention with reference to the attached drawings. Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. It should be understood, however, that there is no intent to limit exemplary embodiments of the invention to the particular forms disclosed, but conversely, exemplary embodiments of the invention are to cover all modifications, equivalents, and alternatives falling within the spirit and scope of the invention.

FIG. 1 is a block diagram illustrating a wireless connecting system to which the present general inventive concept may be applied. As illustrated in FIG. 1, at least two devices are wirelessly connected. Referring to FIG. 1, a device 1 110 is wirelessly connected to a device 2 120, a device 3 130, and a device 4 140. The device 1 110 may be connected to the Internet or a communication network 150 wirelessly or by wire. Although devices used in the present general inventive concept below may be computers capable of wireless communication, devices may include any devices capable of wireless communication and wireless connection such as portable terminals including cellular phones, smart phones, tablet computers, and the like.

Figure 2:
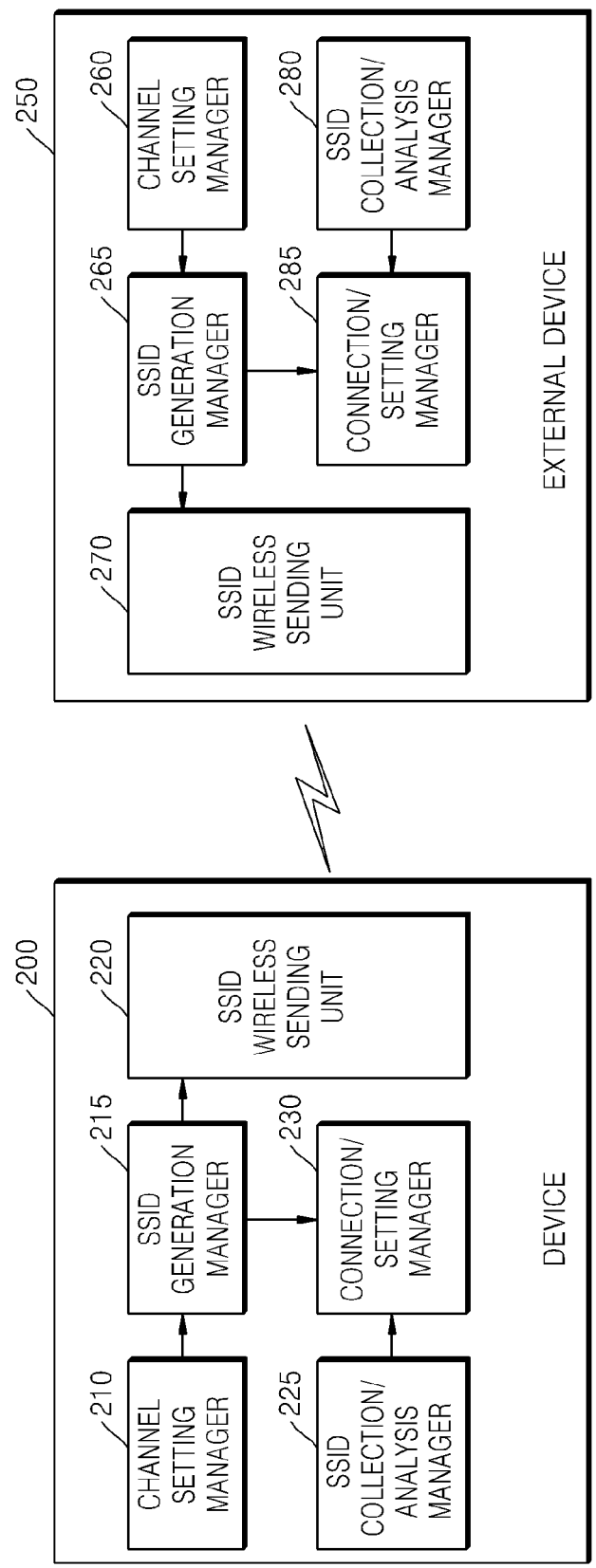
FIG. 2 is a block diagram illustrating a wirelessly connectable device, according to an exemplary embodiment of the present general inventive concept.

FIG. 2 is a block diagram illustrating a wirelessly connectable device 200, according to an exemplary embodiment of the present general inventive concept. Referring to FIG. 2, the device 200 includes a service set identifier (SSID) generation manager 215, an SSID wireless sending unit 220, an SSID collection/analysis manager 225, and a connection/setting manager 230. The device 200 may further include a channel setting manager 210. The external device 250 includes an SSID generation manager 265, an SSID wireless sending unit 270, an SSID collection/analysis manager 280, and a connection/setting manager 285, as well as a channel setting manager 260. These components of the device 200 may be similar to the components of the external device 250. Thus, mainly the components of the device 200 will be described in detail below. The wirelessly connectable device 200 and/or the external device 250 may have a functional unit (not illustrated) to perform a function thereof and a control unit (not illustrated) to control the functional unit. It is possible that the functional unit and the control unit can be connected to the above described manager or unit. The functional unit may be a data processing or communicating unit, a display unit, and/or a user input unit to control the function.

The SSID generation manager 215 of the device 200 generates SSID information including wireless connection priority information allocated to the device 200 and connection status information indicating a wireless connection status of the device 200. The connection status information may include a status indicator such as an "S" (server) representing a connection status of a device to operate as a server when wireless connection is performed between the device 200 and an external device, a "C" (client) indicating a connection status of the device 200 connected to the external device set as the S, and a "D" (device) indicating a connection status of the device 200 that is not wirelessly connected to the external device and that is not set as the S or the C. Similarly, the SSID generation manager 265 of the external device 250 generates SSID information including wireless connection priority information allocated to the device 250 and connection status information indicating a wireless connection status of the device 250.

The SSID wireless sending unit 220 wirelessly sends the SSID information of the device 200 to the external device 250.

The SSID collection/analysis manager 225 collects and analyzes the SSID information of the external device 250 wirelessly sent from the external device 250 that is to be wirelessly connected to the device 200 for wireless communication.

If the connection status information of the external device 250 is set as the server S, the connection/setting manager 230 of the device 200 wirelessly connects the device 200 to the external devices 250 whose connection status information is set as the S. If there is no device having the connection status information set as the S, the connection/setting manager 230 of the device 200 compares wireless connection priority information between the device 200 and other external devices, and then sets the connection status information of a device having high priority according to the wireless connection priority information as the S. For example, if the device 200 has the wireless connection priority information indicating high priority and the external device 250 has the wireless connection priority information indicating low priority, the connection status information of the device 200 having the higher priority may be set as the S. The device set as the server waits until another external device is wirelessly connected thereto.

The wireless connection priority information may be a serial number or a MAC (Media Access Control) address of a WLAN card installed in a device or a random number optionally generated in a device. For example, a greater serial number or a greater MAC (Media Access Control) address may be set to have a higher priority, or a greater random number may be set to have a high priority. As an alternative, a lower serial number or a lower MAC (Media Access Control) address or a lower random number may be set to have a higher priority.

The SSID information may further include channel information used to identify a group of devices that are to be wirelessly connected. In this regard, the channel setting manager 210 sets the channel information by a user's selection or input.

In this regard, the SSID collection/analysis manager 225 of the device 200 collects the SSID information of the external device 250 wirelessly sent from the external device 250 that is to be wirelessly connected, determines whether the channel information of the device 200 is the same as the channel information of the external device 250, by comparing the channel information of the device 200 and the channel information of the external device 250. Then, if the channel information of the device 200 is the same as the channel information of the external device 250, the SSID collection/analysis manager 225 of the device 200 determines if the external device 250 having the same channel information of the device 200 is set as the S.

The SSID information of the device 200 may further include an identifier of wireless connection program installed in the device 200. In this regard, the SSID collection/analysis manager 225 of the device 200 collects the SSID information wirelessly sent from the external device 250 that is to be wirelessly connected, determines whether the identifier of the wireless connection program of the device 200 is the same as an identifier of a wireless connection program of the external device 250, and, if both identifiers of the wireless connection programs are the same, the SSID collection/analysis manager 225 determines whether a device having the same identifier of the device 200 is set as a server the S.

In summary, the SSID information of a device may include wireless connection priority information, connection status information, channel information, and an identifier of a wireless connection program installed in the device. In this regard, the SSID information used throughout the present general inventive concept will now be described in detail. The SSID information corresponds to an identifier of a device, and may be expressed in "SECPCC-XXXXXX-YY-Z," for example. "SECPCC" is an identifier of a wireless connection program. A wireless connection program having the same identifier as that of the wireless connection program of a device is necessarily installed in an external device that is to be wirelessly connected. "XXXXXX" indicates wireless connection priority information, and may use a serial number or a MAC (Media Access Control) address of a WLAN card according to the exemplary embodiment of the present general inventive concept. "YY" indicates channel information indicating a name of a group, i.e., a group of devices that are to be wirelessly connected. "Z" indicates a wireless connection status information of a device. In the exemplary embodiment of the present general inventive concept, the wireless connection status information may include an status indicator such as an "S" (server) representing a connection status of a device to operate as a server when wireless connection is performed between the device and an external device, a "C" (client) indicating connection status of a device connected to an external device set as the S, and a "D" (device) indicating connection status of a device that is not wirelessly connected to an external device and that is not set as the S or the C. The connection status information is apparent when a WLAN is scanned.

Meanwhile, in a case where the device 200 having the wireless connection status information set as the S is referred to as a server device, if the external device 250 requests wireless connection to the server device (i.e., the device 200), the connection/setting manager 230 of the server device may display a screen for a wireless connection request to the server device, and if the server device accepts the wireless connection request and allows the wireless connection to the external device 250, the connection/setting manager 230 may wirelessly connect the server device to the external device 250, and display a representation of the external device 250 on the screen.

Figure 3:
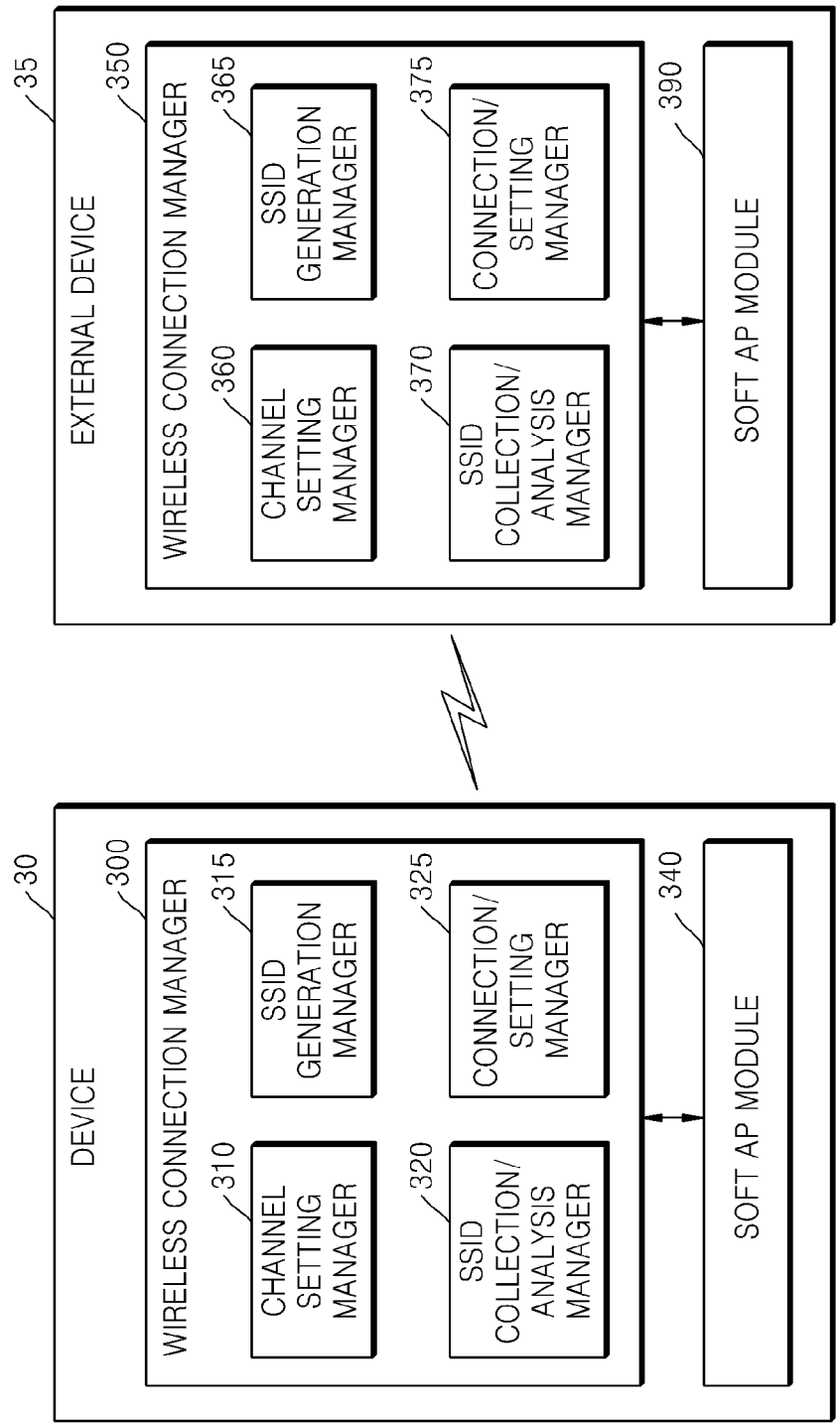
FIG. 3 is a block diagram illustrating a wirelessly connectable device, according to another exemplary embodiment of the present general inventive concept.

FIG. 3 is a block diagram illustrating a wirelessly connectable device 30, according to another exemplary embodiment of the present general inventive concept. Referring to FIG. 3, the device 30 includes a wireless connection manager 300 and a soft AP module 340, and the external device 35 includes a wireless connection manager 350 and a soft AP module 390.

The wireless connection manager 300 of the device 30 may be installed separately from the soft AP module 340, and includes a channel setting manager 310, an SSID generation manager 315, an SSID collection/analysis manager 320, and a collection/setting manager 325. The wireless connection manager 300 generates SSID information, wirelessly sends the SSID information to the external device 35 through the soft AP module 340, collects SSID information generated by the external device 35 through the soft AP module 340, analyzes the collected SSID information, and wirelessly connects the device 30 to the external device 35. The wireless connection manager 300 automatically performs wireless connection between devices by using a program even though a user does not set an SSID, a password, blocking using media access control (MAC), etc. The wireless connection manager 300 and the soft AP module 340 may have a hierarchical structure. That is, the wireless connection manager 300 is installed based on the soft AP module 340 in the device 30. Similarly, the wireless connection manager 350 of the external device 35 may be installed separately from the soft AP module 390, and includes a channel setting manager 360, an SSID generation manager 365, an SSID collection/analysis manager 370, and a collection/setting manager 375. These components of the device 30 may be similar to the components of the external device 35. Thus, mainly the components of the device 30 will be described in detail below.

The soft AP module 340 enables a WLAN card installed in the device 30 to be used as a wireless AP.

The wireless connection manager 300 includes an SSID generation manager 315, an SSID wireless sending unit 320, a connection/setting manager 325, and a channel setting manager 310.

The SSID generation manager 315 generates SSID information. The SSID information generated by the SSID generation manager 315 includes wireless connection priority information allocated to the device 30 and also includes connection status information indicating wireless connection statuses of the device 30. Similarly, the SSID information generated by the SSID generation manager 365 includes wireless connection priority information allocated to the external device 35 and also includes connection status information indicating wireless connection statuses of the external device 35. The SSID information of the device 30 and the external device 35 may further include respective identifiers of wireless connection programs installed in the device 30 and the external device 35, and channel information used to identify a group of devices that are to be wirelessly connected.

Each of the devices collects and analyzes SSID information of other devices wirelessly sent from the other devices that are to be wirelessly connected. The SSID collection/analysis manager 320 of the device 30 collects the SSID information wirelessly sent from the external device 35 that is to be wirelessly connected, and determines whether an identifier of a wireless connection program and channel information of the device 30 are the same as those of the external device 35, based on the SSID information from the external device 35. If both identifiers of the wireless connection program and the channel information are the same, the SSID collection/analysis manager 320 searches for all SSIDs that are to be connected to the same channel, and finds a device whose wireless connection status information is set as the S.

In a case where the device whose wireless connection status information is set as the S, the device is referred to as a server device, and if the server device is found among collected external devices, the connection/setting manager 325 of the device 30 wirelessly connects the device 30 to the server device. If the server device is not found, the connection/setting manager 325 of the device 30 compares wireless connection priority information between the device 30 and collected external devices, and sets a wireless connection status information of a device having high priority as the S. For example, if the device 30 has the wireless connection priority information indicating high priority and the external device 35 has the wireless connection priority information indicating low priority, the connection status information of the device 30 having the higher priority may be set as the S. The device set as the S waits until another external device is wirelessly connected thereto.

If the external device 35 requests wireless connection to the server device, the connection/setting manager of the server device may display a screen for a wireless connection request to the server device, and if the server device accepts the wireless connection request and allows the wireless connection to the external device 35, the connection/setting manager of the server device may wirelessly connect the server device to the external device 35, and display a representation of the external device 35 on the screen.

The channel setting manager 310 sets the channel information according to a user's selection or input. The channel setting manager 310 is a module for setting a channel of a network used to access the soft AP 340 and to use a service before establishing the network. That is, the channel setting manager 310 names a group for sharing files before preparing the group. It is necessary to set the channel of the network to be shared in order to correctly access the network in another device by using the channel of the network. FIG. 7 is an example of a channel setting screen displayed on a device when the channel setting manager 310 sets a channel.

Figure 8:
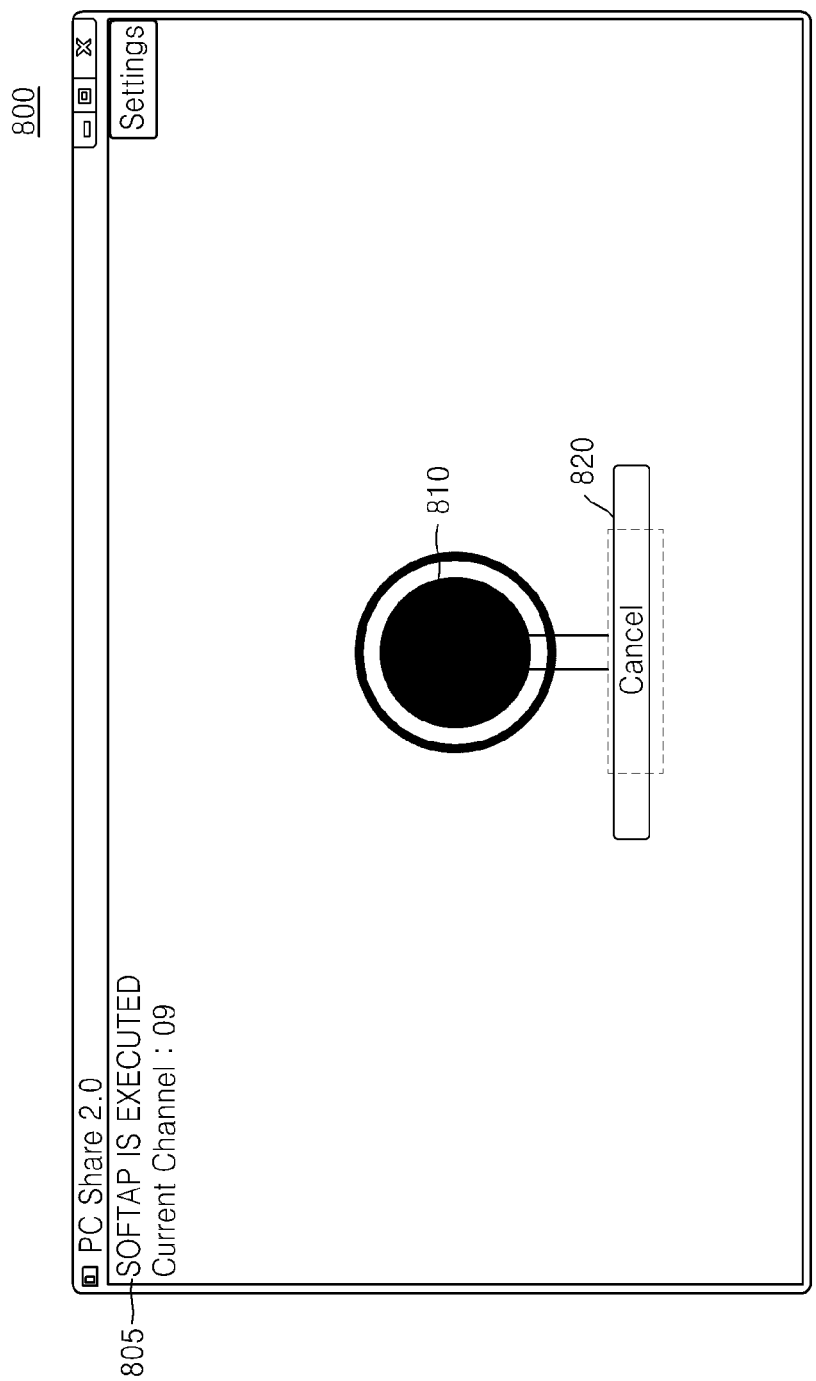
FIG. 8 is a screen illustrating a status indicating another user waiting to gain access after a channel to be currently shared is prepared.

FIG. 8 illustrates a screen 800 converted when a CONNECT button 710 of FIG. 7 is pressed, which shows a status indicating another user waiting to gain access after a group to be currently shared is prepared. That is, the screen may show the status in which another device waits for a request to access a soft AP after a soft AP connection service is prepared.

Figure 4:
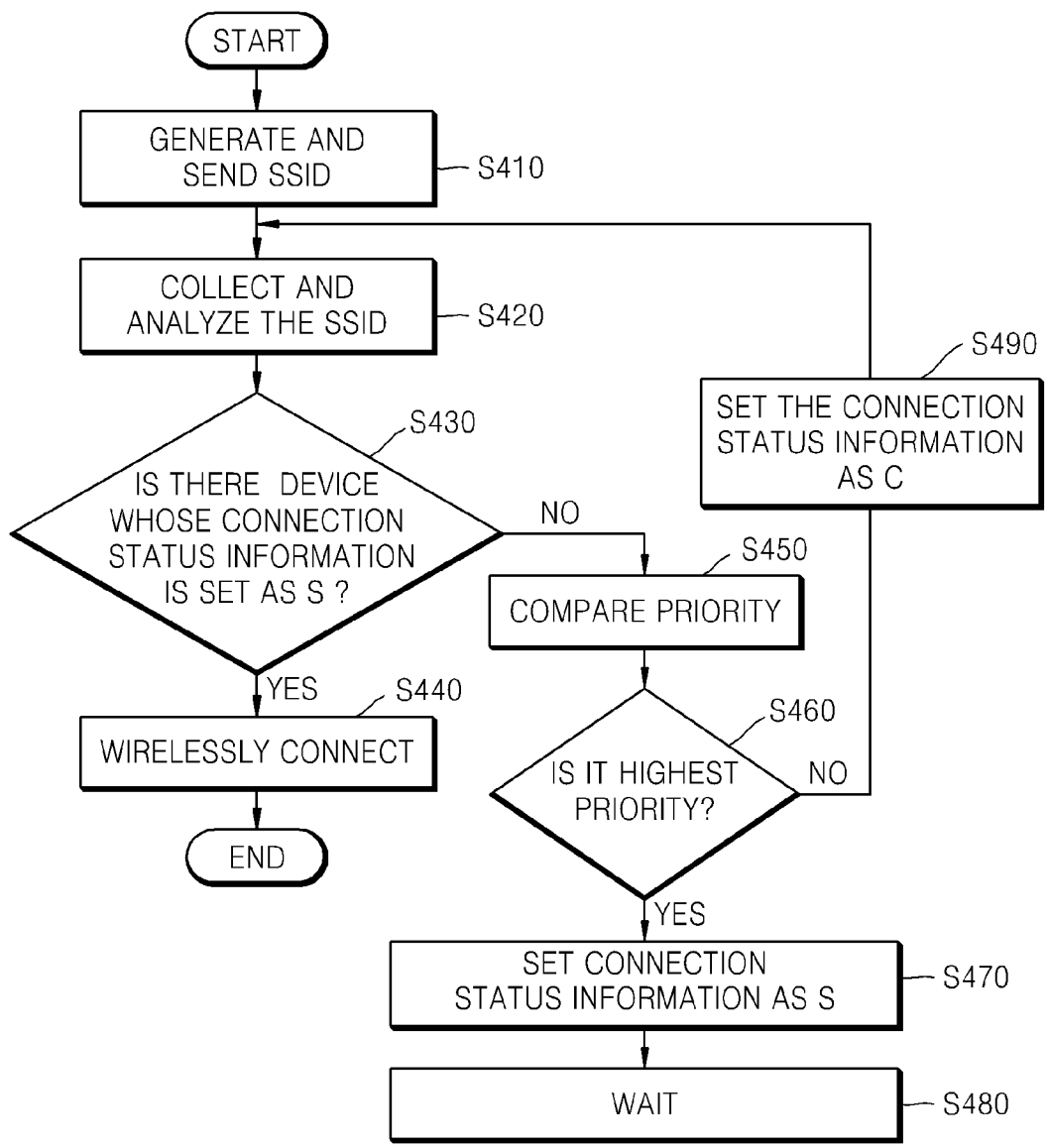
FIG. 4 is a flowchart of a method illustrating wirelessly connecting at least two devices, according to an exemplary embodiment of the present general inventive concept.

FIG. 4 is a flowchart illustrating a method of wirelessly connecting at least two devices, according to an embodiment of the present general inventive concept. Referring to FIG. 4, SSID information including wireless connection priority information allocated to each of at least two devices and connection status information indicating wireless connection statuses of each of at least two devices is generated, and the SSID information is wirelessly sent out from each of the at least two devices (operation S410).

SSID information of at least two devices that is wirelessly sent from at least two devices that are to be wirelessly connected is collected and analyzed (operation S420). It is determined, based on the collected SSID information, whether there is a device whose connection status information of the collected SSID information is set as the S (operation S430), and, if it is determined that the collected SSID of the device includes connection status information set as the S, the device that is to be wireless connected is wirelessly connected to the device whose the connection status information is set as the S (operation S440).

As a result of collecting and analyzing the SSID information, if there is no device having connection status information of the collected SSID information set as the S, the wireless connection priority information allocated to each of at least two devices are compared (operation S450). Based on the comparison, the wireless connection status information of a device having high priority is set as the S (operation S470), and the device whose connection status information is set as the S waits until another external device is wirelessly connected thereto (operation S480). The wireless connection status information of device having low priority is set as a C (operation S490), and the device whose wireless connection status is set C collects and analyzes SSID information of other external devices (operation S420).

In this regard, the wireless connection priority information may be a serial number or a MAC (Media Access Control) address of a WLAN card installed in each of at least two devices or a random number optionally generated in each device. For example, a greater serial number or a MAC (Media Access Control) address may be set to have a higher priority, or a priority may be optionally set with respect to the random number. A greater random number may be set to be a higher priority or vice versa.

The SSID information may further include channel information that is used to identify a group of devices that are to be wirelessly connected and the channel information may be set by a user through a user interface. In this regard, it is determined whether the channel information of each of devices that are to be wirelessly connected is the same through the analysis of the SSID information. If the channel information of a device is determined to be the same as the channel information of another device, it is determined whether there is a device whose connection status information is set as the S. If there is a device whose connection status information is set as the S, the device that is to be wirelessly connected is wirelessly connected to the device whose connection status information is set as the S.

The SSID information may further include an identifier of a wireless connection program installed in each of at least two devices. In this regard, it is determined whether identifiers of the wireless connection programs respectively installed in at least two devices are the same with each other through the analysis of the SSID information. If the identifiers of the wireless connection programs are determined to be the same, it is determined if there is a device whose connection status information is set as the S. If there is the device whose the connection status information is set as the S, the device that is to be wireless connected is wirelessly connected to the device whose connection status information is set as the S Meanwhile, the connection status information may include a status indicator such as the S (server), the C (client) indicating a connection status of a device connected to an external device set as the S, and the D (device) indicating a connection status of a device that is not wirelessly connected to an external device.

In a case where a device whose wireless connection status information is set as the S, the device is referred to as a server device, and if an external device requests wireless connection to the server device, a screen for a wireless connection request may be displayed at the server device. If the server device accepts the wireless connection request and allows the wireless connection to the external device, the server device and the external device may be wirelessly connected to each other, and a representation of the external device may be displayed on the screen.

Figure 5A:
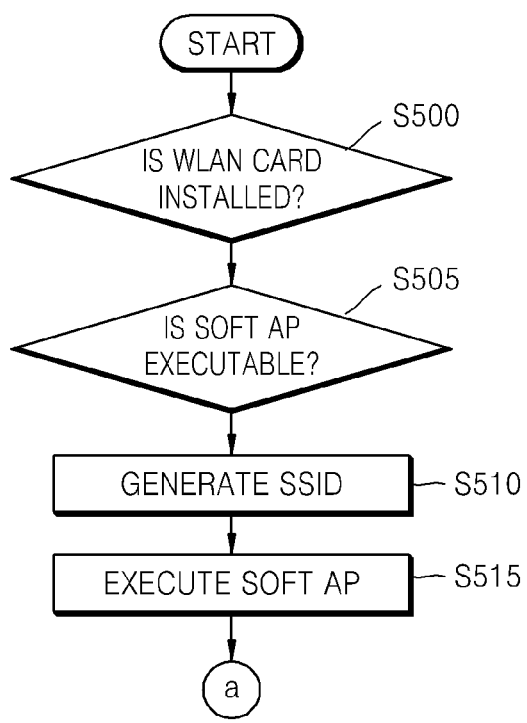
FIG. 5 is a detailed flowchart illustrating a method of wirelessly connecting at least two devices, according to an exemplary embodiment of the present general inventive concept.
Figure 5B:
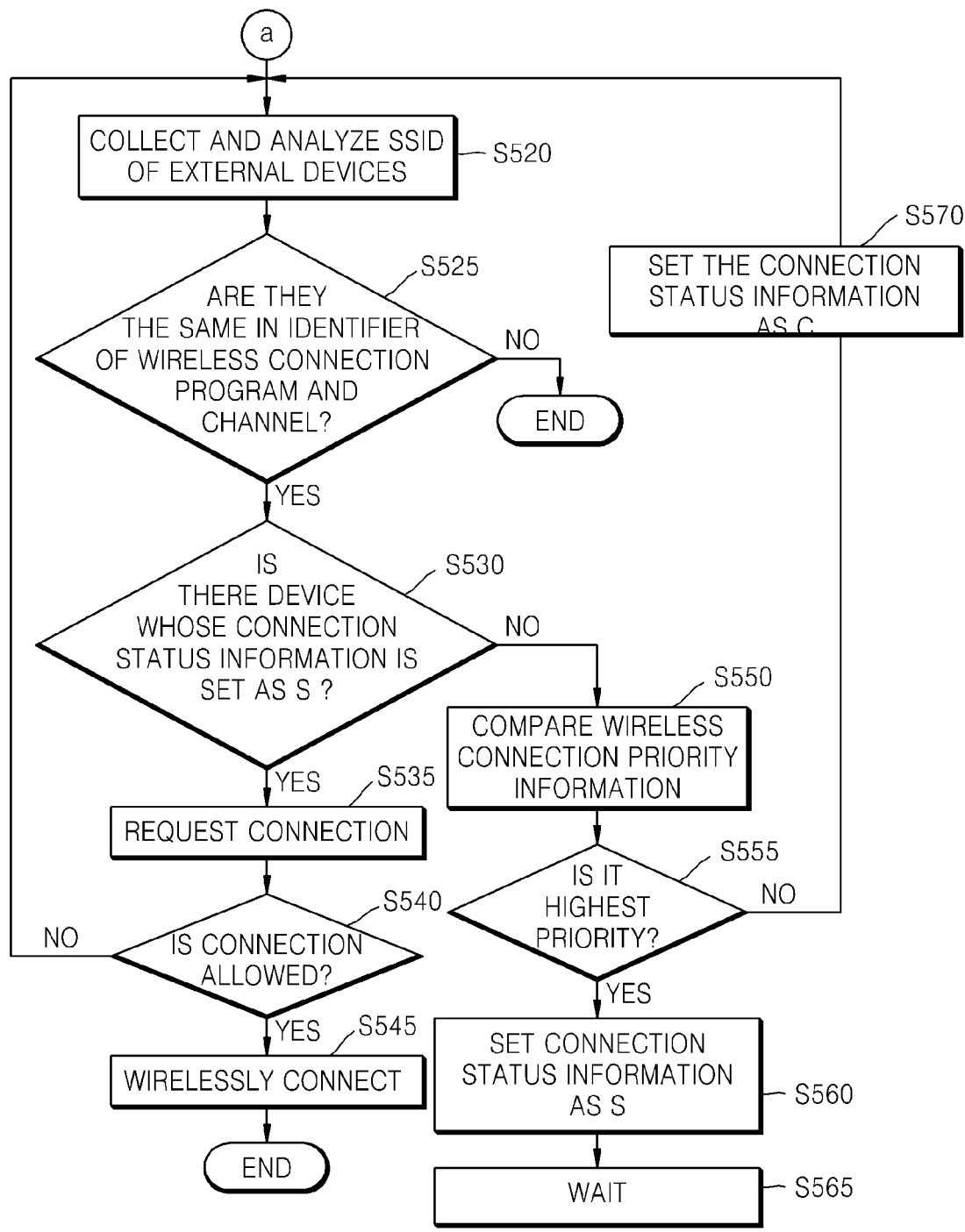

FIG. 5 is a detailed flowchart illustrating a method of wirelessly connecting at least two devices, according to another embodiment of the present general inventive concept. Referring to FIGS. 3 and 5, it is determined whether a WLAN card is installed in the device 30 and/or whether a WLAN card is installed in the external device 35 (operations S500). If it is determined that WLAN cards are installed, it is determined whether the soft AP module 340 is executable (operation S505). If it is determined that the soft AP module 340 is executable, the device 30 generates an SSID (operation S510). FIG. 7 is a screen 700 displayed when a user executes the wireless connection managers 300. A similar screen may be displayed when the wireless connection manager 350 is executed. The user first sets a channel, using the screen 700 of FIG. 7, for example. The channel may be set using the channel selection portion 730 by moving the channel selection box 720 to a desired channel number (FIG. 7). The channel is a name of a group to be shared. If the user sets a channel 9 and prepares a group, the user may share files with other users who access the channel 9. If the user sets a desired room number (e.g., a desired channel number) and clicks a CONNECT button 710, the room to be shared is prepared based on a soft AP service. The user does not need to have knowledge of a soft AP and also does not need to set complicated settings to use the soft AP. If the user merely sets the channel and presses the CONNECT button, the soft AP is automatically accessed and set to use the soft AP service. In this regard, automatic setting means an SSID setting, a password setting, a blocking setting using MAC, a change in a WLAN mode, etc. for soft AP connection. Further, in FIG. 7, the status portion 705 indicates NULL, indicating no connection is available.

The soft AP module 340 is executed to wirelessly send the SSID to the external device 35 (operation S515).

Thereafter, a wireless connection operation starts through wireless connection programs installed in the device 30. The SSID collection/analysis manager 320 collects and analyzes SSIDs of external devices. It is determined whether identifiers of wireless connection programs are the same through the analysis of the SSIDs. If identifiers are determined to be the same, it is determined whether channels are the same (operation S525). If identifiers or channels are determined not to be the same, the wireless connection operation ends.

If identifiers or channels are determined to be the same, it is determined whether there is a device whose connection status information is set as the S (operation S530). If it is determined that there is the device whose connection station information is set as the S, the connection/setting manager 325 of the device 30 requests connection to the device whose connection status information is set as the S (operation S540). If the device whose connection status information is set as the S allows the device 30 to be connected, the connection/setting manager 325 wirelessly connects the device 30 to the device whose connection status information is set as the S (operation S545).

If it is determined in operation S530 that there is no device whose connection status information is set as the S, the connection/setting manger 325 compares wireless connection priority information of the device 30 to that of the external device 35 (operation S550). The connection/setting manager 325 sets connection status information of a device having the highest priority as the S. The device whose connection status information is set as the S waits until another external device requests connection thereto (operation S565). That is, this may be a status in which the device waits until a request is received for connection to the soft AP after the soft AP connection service is prepared.

As a result of comparing the wireless connection priority information, connection status information of a device having a low priority is set as the C (operation S570). Then, SSIDs of external devices are collected and analyzed (operation S520).

Figure 9:
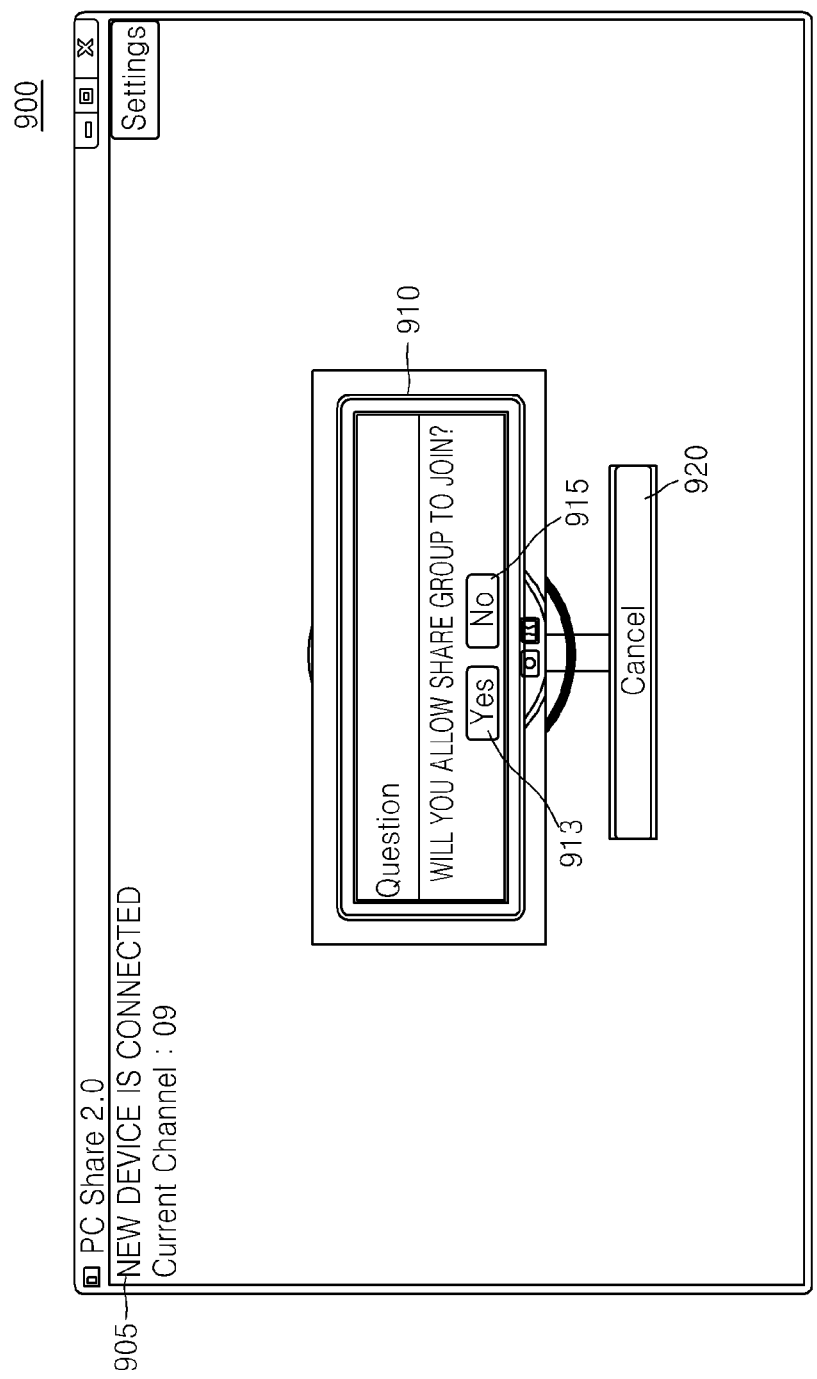
FIG. 9 is a screen illustrating a connection request of another device while connection of another device is waiting after a channel to be shared is prepared.

FIG. 9 is a screen 900 illustrating a connection request of another device while connection of another device is waiting after a group to be shared is prepared. If the connection request of another device is received, a popup window of the connection request 910 appears. The connection request window 910 may ask whether the user will allow a share group to join. If a user presses a Yes button 913, the connection of another device is allowed, and the screen is changed to a screen 1000 of FIG. 10 that indicates that both devices are connected. If the user presses a No button 915, the connection of another device is not allowed, and the screen is again changed to the screen 800 of FIG. 8 in which another device waits for connection. The screen 900 of FIG. 9 also has a status portion 905 indicating that a new device connection is requested. Further, the user may cancel the connection by pressing the Cancel button 920, which may revert the screen 900 of FIG. 9 to the screen 700 of FIG. 7.

Figure 10:
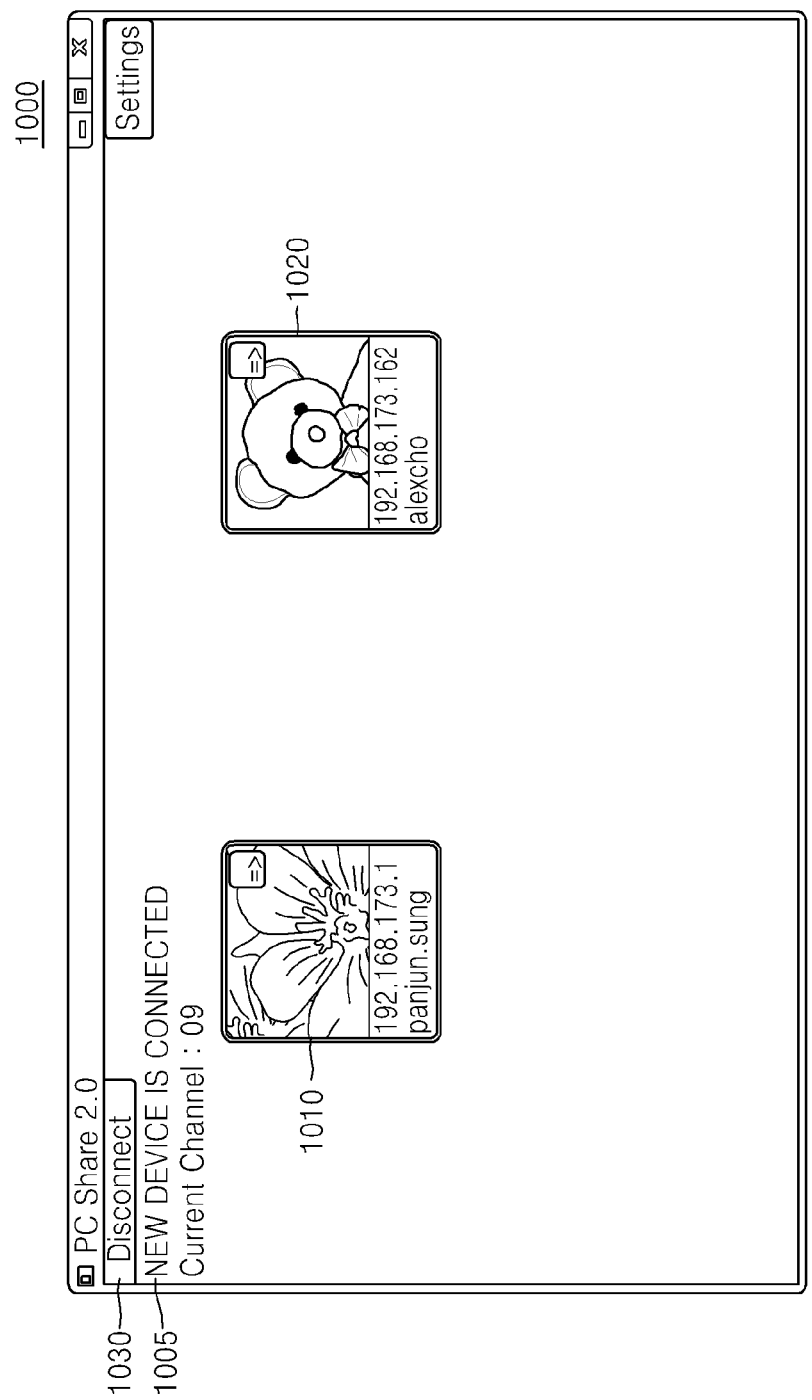
FIG. 10 is a screen illustrating a service is available in a wireless connection status after a soft AP is accessed.

FIG. 10 is a screen 1000 illustrating a representation 1010 (e.g., photo) registered by a device that prepares a group and a representation 1020 registered by another device requesting connection to the device. The representations 1010 and 1020 may include photos representing the respective devices, as well as respective user identifiers and internet protocol addresses. The screen 1000 of FIG. 10 may be displayed after the device is connected to the device requesting connection thereto by pressing the Yes button 913 of FIG. 9. In addition, for example, if a connection request of another device (e.g., a third device) is accepted, the third device requesting the connection is also connected to the existing devices, and a photo registered by the third device requesting the connection is displayed on the screen. FIG. 10 shows that a service is available after a soft AP is accessed. The screen 1000 of FIG. 10 also has a status portion 1005 indicating that a new device is connected. If the user wishes to disconnect from the connected device, the user may select the disconnect button 1030.

FIG. 6 is a flowchart illustrating a method of wirelessly connecting two devices, Device 1 and Device 2, in a case where connection status information of a device is not set as S or C but is set as D, according to another embodiment of the present general inventive concept. A device status is a first attempt to perform wireless connection. Operations S600, S602, S604, S606, S608, S630, S632, S634, S636 and S638 are performed by Device 1, and operations S650, S652, S654, S656, S658, S660, S662, S664, S666, and S668 are performed by Device 2. Further, operations S610, S620, and S670 are performed by both Device 1 and Device 2. Although the flowchart illustrated in FIG. 6 includes two devices, more than two devices may be involved in the method of FIG. 6.

Referring to FIG. 6, the two devices, Device 1 and Device 2, execute wireless connection managers (operation S600, S650). The two devices set channels (operation S602, S652), click CONNECT buttons and start wireless connection operations (operation S604, S654).

If a user firstly executes a wireless connection manager, the screen of FIG. 7 is displayed. In this regard, a channel may be set. If a group is prepared by setting a channel 9, the user may share files with other users who access the channel 9. If the user sets a desired room number (e.g., channel number) and clicks the CONNECT button, the group to be shared is prepared based on a soft AP service.

If wireless connection operations start, an SSID is generated and is wirelessly sent through a soft AP (operation S606, S656). A WLAN is scanned to collect SSIDs of peripheral devices (operation S608, S658).

If SSIDs of external devices are collected, the SSIDs are analyzed. If identifiers of wireless connection programs and channels information of the devices that is to be wireless connected are the same, wireless connection priority information the devices are compared (operation S620). A device having a high priority SSID scans the WLAN to collect SSID information of external devices. Thus, in this example, because the SSID of Device 1 is determined to have a high priority (operation S630), Device 1 having the high priority SSID scans the WLAN (operation S632). Connection status information of the device is set as S (operation S634). In this regard, operation S632 may be skipped. If the SSID of Device 2 is determined to have low priority (operation S660), Device 2 is not set as the S, and waits (operation S662).

If the connection status information of Device 1 is set as the S, Device 1 waits for a connection request of a external device (operation S636). If the connection request of the external device is received, as the external device such as Device 2 requests the connection (operation S668), Device 1 accepts the connection request (operation S638), and Device 1 and Device 2 are wirelessly connected to each other (operation S670).

If the CONNECT button 710 of FIG. 7 is pressed, the screen is changed to the screen 800 of FIG. 8. The screen 800 of FIG. 8 shows a status 810 indicating another user waiting to gain access after a group to be currently shared is prepared. That is, the screen 800 may show the status 810 indicating that another device waits for a request to access a soft AP after a soft AP connection service is prepared. The screen 800 of FIG. 8 also has a status portion 805 indicating that soft AP is executed. Further, the user may cancel the connection by pressing the Cancel button 820, which may revert the screen 800 of FIG. 8 to the screen 700 of FIG. 7.

FIG. 9 is a screen 900 illustrating a connection request of another device while another device is waiting for connection after a group to be shared is prepared. If the connection request of another device is received, a popup window appears. If a user presses a Yes button 913, the connection of another device is allowed, and the screen is changed to a screen 1000 of FIG. 10 that indicates that both devices are connected. If the user presses a No button 915, the connection of another device is not allowed, and the screen is again changed to the screen 800 of FIG. 8 in which another device waits to connect.

FIG. 10 is a screen 1000 illustrating a photo 1010 registered by a device that prepares a group and a photo 1020 registered by another device that requests connection to the device, after the device is connected to the device that requests connection thereto by pressing the Yes button 913 of FIG. 9. If a connection request of another device is accepted, the device that requests connection is also connected to existing devices, and a photo registered by the device that requests connection is displayed on the screen. FIG. 10 shows that a service is available after a soft AP is accessed.

Meanwhile, Device 2 having a low priority SSID waits for a short time (operation S662), scans the WLAN (operation S664), and, if a device having connection status information set as a server is found (operation S666), requests connection to the device set as the server (i.e. Device 1 set as the server) (operation S668).

Additionally, referring to FIG. 6, the wireless connection managers set SSIDs of network cards of at least two devices. In this regard, the SSID may be a type of ID. The wireless connection managers scan the WLAN to search for all SSIDs that are to access the same channel. The wireless connection managers compare priority information between all of the found SSIDs. SSIDs are compared based on SSID serial numbers of respective network cards. An SSID usually has a value like "SECPPC-XXXXXX" in which a 6 digit value "XXXXXX" is a serial number that is used to compare this SSID with other SSIDs.

In this regard, the device having a low priority SSID waits, and the device having a high priority SSID scans the WLAN and is set as a group-S SSID. Setting of the group-S SSID means setting of a kind of a server status S. In this regard, if a network is generated by setting a channel, the device having the group-S waits for a connection request. The device having the low priority SSID scans the WLAN and searches for the group-S SSID, i.e. an SSID of the server. If the SSID of the server is found, the device having the low priority SSID requests connection to a server device having the group-S SSID. If the server device receives a connection request and accepts it, the device having the low priority SSID accesses the network established by the server device and is connected thereto.

According to the present general inventive concept, all processes for wireless connection between devices are performed as if a user makes inputs and settings, thereby enabling wireless connection between at least two devices. Therefore, errors caused by user's wrong inputs and settings are prevented in advance, and time taken to make user's inputs and settings is reduced.

Also, although a user has no knowledge of a soft AP or a wireless AP, devices are wirelessly connected easily.

The present general inventive concept can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of wirelessly connecting at least two devices for data communication, the method comprising:

generating and wirelessly sending service set identifier (SSID) information of the at least two devices, the at least two devices performing the generating and the wireless sending;

collecting and analyzing the wirelessly sent SSID information, the collecting and the analyzing to be performed by the at least two devices;

setting one of the at least two devices as a server and another of the at least two devices as a client based on a result of the analyzing; and wirelessly connecting the at least two devices, the wirelessly connecting to be performed by the device set as the server.

2. The method of claim 1, wherein the setting comprises:
setting one of the at least two devices as the server according to a priority between the SSID information of the at least two devices.

3. The method of claim 1, wherein the setting comprises:
if there is a device set as the server based on the result of the analyzing, requesting wireless connection from the device set as the server, and if no device is set as the server, setting one of the at least two devices as the server according to the priority between the SSID information of the at least two devices.

4. The method of claim 1, wherein each of the SSID information comprises connection status information indicating a wireless connection status of a corresponding device, and
wherein the connection status information comprises one of a server status indicating connection status of a device set as a server, a client status indicating connection status of a device connected to the device set as the server, and a device status indicating a connection status of a device that is not wirelessly connected to an external device.

5. The method of claim 4, wherein:
each of the SSID information further comprises
wireless connection priority information of the corresponding device;
channel information to identify a group of devices and being settable by a user through a user interface; and
an identifier of a wireless connection program installed in a corresponding device
the wireless connection priority information comprises a serial number or a MAC (Media Access Control) address of a wireless local area network (WLAN) card installed in the corresponding device or a random number optionally generated by the corresponding device, wherein a greater serial number or a MAC (Media Access Control) address or random number is set to indicate a higher priority,
the wireless connecting comprises:
determining whether the identifiers of the wireless connection programs respectively installed in at least two devices are the same;
if the identifiers of the wireless connection programs are the same, comparing the channel information of the at least two devices;
if the channel information of the at least two devices is the same with each other, checking whether the connection status information is set as the server; and
wirelessly connecting a device that is to be wirelessly connected and the device whose connection status information is set as the server.

6. The method of claim 1, wherein the wireless connecting comprises:
if the device set as the server is referred to as a server device, and a device other than the server device requests wireless connection from the server device, displaying a wireless connection request on a screen of the server device; and
if the server device accepts the wireless connection request and allows access thereto, wirelessly connecting the server device to the device that requests the wireless connection and displaying a representation of the requesting device on the screen of the server device.

7. A non-transitory computer-readable recording medium having recorded thereon a computer program for executing the method of claim 1.

8. A device comprising:
a wireless LAN unit; and
a controller configured to communicate with the wireless LAN unit, to generate SSID information and to wirelessly send out the generated SSID information through the wireless LAN unit, to collect SSID information generated by at least one external device through the wireless LAN unit, to analyze the collected SSID information and to set the device as a server or a client of a wireless AP, and to establish wireless connection between the device and the at least one external device according to a result of the setting.

9. The device of claim 8, wherein the controller is configured to request wireless connection form a server device set as the server if the server device is set as the server, and to set one of the device and the at least one external device as the server according to priority between the SSID information thereof if no device is set as the server.

10. The device of claim 9, wherein, if the device having a wireless connection status set to indicate the server is referred to as the server device, and the at least one external device requests wireless connection from the server device, the controller displays a wireless connection request on a screen of the server device, and
wherein if the server device accepts a wireless connection request and allows access thereto, the controller wirelessly connects the server device to the at least one external device, and displays a representation of the at least one external device on the screen of the server device.

11. The device of claim 8, wherein each of the SSID information of the device and the at least one external device comprises:
connection status information indicating wireless connection status of a corresponding one of the device and the at least one external device; and
wherein connection priority information indicating a wireless connection priority between the device and the at least one external device.

12. The device of claim 11, wherein:
each of the SSID information of the device and the at least one external device further comprises:
a device identifier of a wireless connection program installed in the device or the at least one external device;
channel information used to indentify a group of devices that are to be wirelessly connected,
wherein the controller is configured to set the channel information according to a user's selection or input.

13. The device of claim 12, wherein the controller collects SSID information that is wirelessly sent from the at least one external device that is to be wirelessly connected, determines whether the identifiers of the wireless connection program and the channel information between the device and the at least one external device that is to be wirelessly connected are the same, and if the identifiers of the wireless connection program and the channel information are the same, the controller checks whether any of the connection status information is set to indicate the server.

14. A device wirelessly connectable to at least one device, the device comprising:
   one or more processors;
   a memory; and
   one or more programs, wherein the one or more programs are stored in the memory and configured to be executed by the one or more processors, the programs including:
      an SSID information generation module configured to generate SSID information of the device;
      an SSID information sending module configured to wirelessly send the generated SSID information;
      an SSID collection/analysis module configured to collect and to analyze wirelessly sent SSID information of the at least one device; and
      a connection/setting module configured to set the device as a server or a client based on a result of the analyzing, and to perform or to request wireless connection between the device and the at least one device based on a result of the setting.

15. The device of claim 14, wherein the connection/setting module sets one of the device and the at least one device as the server according to a priority between the SSID information thereof,
   if the device is set as the server based on the result of the analyzing a connection/setting module of the at least one device requests to the device set as the server wireless connection between the device and the at least one device, and
   if none of the device and the at least one device is set as the server, the connection/setting module of the device sets one of the device and the at least one device as the server according to a priority between the SSID information thereof.

16. The device of claim 14, wherein the SSID information of the device and the at least one device comprises connection status information indicating wireless connection statuses of the device and the at least one device, respectively, and
   wherein the connection status information comprises one of a server status indicating connection status of device set as a server, a client status indicating connection status of a device connected to the device set as the server, and a device status indicating a connection status of a device that is not wirelessly connected to an external device.

17. The device of claim 16, wherein the SSID information of the device and the at least one device further comprises:
   wireless connection priority information of the device and the at least one device, respectively;
   channel information to identify a group of devices and being settable by a user through a user interface; and
   an identifier of a wireless connection program installed in each of the device and the at least one device,
   wherein each of the wireless connection priority information of the device and the at least one device comprises a serial number or a MAC (Media Access Control) address of a WLAN card installed in each of the at least one device or a random number optionally generated by each of the device and the at least one device, wherein a greater serial number or or a MAC (Media Access Control) address or random number has a higher priority, and
   the connection/setting module determines whether the identifiers of the wireless connection programs of the device and the at least one device are the same; if the identifiers of the wireless connection programs are the same, the connection/setting module compares the channel information of the device and the at least one device; and if the channel information is the same, the connection/setting module of the device checks whether the connection status information of the at least one device is set to indicate the server; and, if the connection status information of the at least one device is set to indicate the server, the connection/setting module of the device accesses the at least one device set as the server and wirelessly connects the device and the at least one device.

18. A method of wirelessly connecting one device and at least one external device, the method comprising:
   installing wireless connection programs in the one device and the at least one external device;
   executing the installed wireless connection programs in the one device and the at least one external device;
   displaying channel setting screens for setting channels on the one device and the at least one external device; and
   if a user inputs channel information through the channel setting screens and clicks a connection button provided by the channel setting screens, wirelessly connecting the one device and the at least one external device.

19. The method of claim 18, wherein the wirelessly connecting the one device and the at least one external device comprise:
   if the user inputs channel information through the channel setting screens and clicks the connection button provided by the channel setting screens, displaying a screen that waits for a connection request from the at least one external device, wherein the one device performs the displaying;
   if the one device receives the connection request from the at least one external device, displaying a connection allowance interface screen that asks whether access for a wireless connection is allowed, wherein the one device performs the displaying;
   if access of the at least one external device is allowed, wirelessly connecting the one device to the at least one external device whose access is allowed, wherein the one device performs the wirelessly connecting;
   informing connection of a new device through a user interface screen, wherein the one device performs the notifying; and
   displaying a file registered by the one device and a file registered by the wirelessly connected external device on the user interface screen, wherein the one device performs the displaying.

20. A device wirelessly connectable to at least one external device, the device comprising:
   a storage unit for storing wireless connection programs in the device and the at least one external device; and
   one or more processors for executing the wireless connection programs and to set the device as one of a server or a client and to set the external device as another of the server or the client,
   wherein, if the one or more processor execute the wireless connection programs, the one or more processors display channel setting screens for setting channels on the device and the at least one external device,
   if a user inputs channel information through the channel setting screens and clicks a connection button provided by the channel setting screens and the server accepts a connection request received from the client, the one device and the at least one external device are wirelessly connected to each other.

21. The device of claim 20, wherein, if the user inputs channel information through the channel setting screens and clicks the connection button provided by the channel setting screens, the one or more processors display a screen that waits for a connection request from the at least one external device,
  if the one device receives the connection request from the at least one external device, the one or more processors display a connection allowance interface screen that asks whether access for a wireless connection is allowed,
  if access of the at least one external device is allowed, the one or more processors wirelessly connect the one device to the at least one external device whose access is allowed, informs connection of a new device through a user interface screen, wherein the one device performs the notifying, and displays a file registered by the one device and a file registered by the wirelessly connected external device on the user interface screen.

22. A device wirelessly connectable to at least one device, the device comprising:
  a wireless sending/receiving unit configured to wirelessly send SSID information of the device and to wirelessly recieve SSID information from at least one device; and
  a processor configured to communicate with the wireless sending/receiving unit, to generate SSID information and to wirelessly send the generated SSID information through the wireless sending/receiving unit, to collect SSID information generated by the at least one device through the wireless sending/receiving unit, to analyze the collected SSID information and to set a device as a server or a client, and to perform or to request wireless connection between the device and the at least one device according to a result of the setting.

23. The device of claim 22, wherein the processor sets one of the device and the at least one device as the server according to a priority between the SSID information thereof,
  if the device is set as the server based on the result of the analyzing, the at least one device requests to the device set as the server wireless connection between the device and the at least one device, and
  if none of the device and the at least one device is set as the server, the device sets one of the device and the at least one device as the server according to a priority between the SSID information thereof.

24. The device of claim 22, wherein the SSID information of the device and the at least one device comprises connection status information indicating wireless connection statuses of the device and the at least one device, respectively, and
  wherein the connection status information comprises one of a server status indicating connection status of device set as a server, a client status indicating connection status of a device connected to the device set as the server, and a device status indicating a connection status of a device that is not wirelessly connected to an external device.

25. The device of claim 24, wherein the SSID information of the device and the at least one device further comprises:
  wireless connection priority information of the device and the at least one device, respectively;
  channel information to indentify a group of devices and being settable by a user through a user interface; and
  an identifier of a wireless connection program installed in each of the device and the at least one device,
  wherein each of the wireless connection priority information of the device and the at least one device comprises a serial number or a MAC (Media Access Control) address of a WLAN card installed in each of the at least one device or a random number optionally generated by each of the device and the at least one device, wherein a greater serial number or or a MAC (Media Access Control) address or random number has a higher priority, and
  the processor determines whether the identifiers of the wireless connection programs of the device and the at least one device are the same; if the identifiers of the wireless connection programs are the same, the processor compares the channel information of the device and the at least one device; and if the channel information is the same, the processor of the device checks whether the connection status information of the at least one device is set to indicate the server; and, if the connection status information of the at least one device is set to indicate the server, the processor of the device accesses the at least one device set as the server and wirelessly connects the device and the at least one device.

* * * * *

UNITED STATES PATENT AND TRADEMARK OFFICE
CERTIFICATE OF CORRECTION

| | | |
|---|---|---|
| PATENT NO. | : 9,204,367 B2 | Page 1 of 2 |
| APPLICATION NO. | : 13/598806 | |
| DATED | : December 1, 2015 | |
| INVENTOR(S) | : Pan-jun Sung | |

It is certified that error appears in the above-identified patent and that said Letters Patent is hereby corrected as shown below:

On the title page, item 56
Column 2 (Other Publications), Line 2:
Delete "Specication," and insert -- Specification, --, therefor.

In the claims
Claim 9, Column 18, Line 25:
Delete "form" and insert -- from --, therefor.

Claim 9, Column 18, Line 28:
After "to" insert -- a --.

Claim 11, Column 18, Line 48:
Delete "wherein" and insert -- wireless --, therefor.

Claim 12, Column 18, Line 56:
Delete "indentify" and insert -- identify --, therefor.

Claim 17, Column 19, Line 60:
Delete "or or" and insert -- or --, therefor.

Claim 20, Column 20, Line 55:
Delete "processor" and insert -- processors --, therefor.

Claim 22, Column 21, Line 20:
Delete "recieve" and insert -- receive --, therefor.

Claim 22, Column 21, Line 27:
Delete "a" and insert -- the --, therefor.

Signed and Sealed this
Third Day of May, 2016

Michelle K. Lee
*Director of the United States Patent and Trademark Office*

CERTIFICATE OF CORRECTION (continued)
U.S. Pat. No. 9,204,367 B2

Claim 25, Column 22, Line 15:
Delete "indentify" and insert -- identify --, therefor.

Claim 25, Column 22, Line 25:
Delete "or or" and insert -- or --, therefor.